United States Patent [19]
Hettlage et al.

[11] Patent Number: 5,264,755
[45] Date of Patent: Nov. 23, 1993

[54] STEPPING MOTOR TO DRIVE A BODY, ESPECIALLY A SHAFT, THROUGH SMALL ANGLES OF ROTATION PER STEP

[75] Inventors: Eckart Hettlage, Karlsruhe; Gerd Ruff; Thomas Eckardt, both of Heidelberg, all of Fed. Rep. of Germany

[73] Assignee: Teldix GmbH, Heidelberg, Fed. Rep. of Germany

[21] Appl. No.: 859,483

[22] PCT Filed: Nov. 29, 1990

[86] PCT No.: PCT/EP90/02054
§ 371 Date: Jun. 16, 1992
§ 102(e) Date: Jun. 16, 1992

[87] PCT Pub. No.: WO91/09428
PCT Pub. Date: Jun. 27, 1991

[30] Foreign Application Priority Data
Dec. 16, 1989 [DE] Fed. Rep. of Germany ....... 3941652

[51] Int. Cl.⁵ .............................................. H01L 41/08
[52] U.S. Cl. ................................... 310/328; 310/323; 310/316; 310/49 R
[58] Field of Search .............. 310/323, 328, 316, 49 R

[56] References Cited

U.S. PATENT DOCUMENTS

| | | | |
|---|---|---|---|
| 3,211,931 | 10/1965 | Tehon | 310/328 |
| 4,468,583 | 8/1984 | Mori | 310/328 |
| 5,027,028 | 6/1991 | Skipper | 310/328 |
| 5,063,321 | 11/1991 | Carter | 310/323 |
| 5,107,162 | 4/1992 | Yamaguchi | 310/323 X |
| 5,144,187 | 9/1992 | Culp | 310/328 |

FOREIGN PATENT DOCUMENTS

| | | |
|---|---|---|
| 0112454 | 7/1984 | European Pat. Off. . |
| 501352 | 6/1928 | Fed. Rep. of Germany . |
| 3225949 | 1/1984 | Fed. Rep. of Germany . |
| 3544930 | 6/1987 | Fed. Rep. of Germany . |

OTHER PUBLICATIONS

Lueger, Lexikon Der Technik, In:Vierte, Vollständig neu bearbeitete und erweiterte Auflage in 17 Bänten; by Ehrhardt et al.; Deutsch Verlags-Anstalt, Stuttgart, 1960, S. 416–418.

*Primary Examiner*—Mark O. Budd
*Attorney, Agent, or Firm*—Spensley Horn Jubas & Lubitz

[57] ABSTRACT

A stepping motor for rotating a body through small angles of rotation, the stepping motor having a stator and a rotor, an actively moveable connection unit for selectively connecting each of the stator and rotor to the body, and a drive which can be triggered and acts on the rotor. For performing an individual rotational step, the triggering of the drive and the connecting of the rotor with the body are essentially effected during a given period of time, and each time after performing a rotational step, triggering of the connection of the stator with the body takes place in order to maintain the body in the particular position attained. The stepping motor further includes at least one spring element which acts counter to the rotation of the rotor and stator in relation to each other and is provided between the rotor and the stator, and two rings disposed coaxially to each other and to the body, one of the rings being fixedly connected with the stator and the other of the rings forming part of the rotor, and the spring element being connected between the rings.

19 Claims, 7 Drawing Sheets

| | | |
|---|---|---|
| a | = | Transport der Welle durch Torsionsring 27 |
| b, b' | = | Transport der Welle durch Torsionsringe 27 u. 28 |
| c | = | Rücklauf des Torsionsrings 27 |
| d, d' | = | Transport der Welle durch Torsionsring 27 u. 28 |
| c' | = | Rücklauf des Torsionsrings 28 |
| a' | = | Transport der Welle durch Torsionsring 28 |
| MK | = | Magnetkupplung |

STEPPING MOTOR TO DRIVE A BODY, ESPECIALLY A SHAFT, THROUGH SMALL ANGLES OF ROTATION PER STEP

STATE OF THE ART

The invention relates to a step motor to drive a body, especially a shaft, through small angles of rotation, having the characteristics of the preamble of claim 1.

There is a multitude of step motors, also those with small steps.

Often reducing gears in the most varied forms are used for this. Gears mostly have the disadvantage of blocking the drive when the motor fails and, with a few exceptions, of only rarely permitting redundancy.

Another disadvantage of gears lies in the manufacturing cost and in the gear play which is always required and makes steps through very small angular ranges impossible.

OBJECT

It is the object of the invention to provide a step motor to drive a body, especially a shaft, through small angles of rotation per step, where the mentioned disadvantages are avoided.

This object is attained by the features recited in the characterizing part of claim 1. Advantageous embodiments of the invention ensue from the dependent claims and from the description.

DESCRIPTION

The step motor in accordance with the invention permits the transfer of large moments in very small steps to a body to be rotated, in particular to a shaft. In this case the sequence of steps is relatively slow. An encoder can be used for determining the exact momentary position of the body or the shaft.

The step motor in accordance with the invention contains a stator, a rotor, which rotates a body, and a drive acting on the rotor. At least one spring element, which acts counter to the rotation of these parts in relation to each other, is provided between the rotor and the stator. In this case, a rotor is understood to be a ring with at least two spring elements and active, movable elements also disposed on the ring, which are connected with the body for moving the body out of an initial position. A similar structure is provided for the stator. The drive for performing a rotational step is triggered together with the connection of the rotor with the body. After performing the step, and overlapping the triggering of the connection of the rotor to the body, the stator is connected with the body to maintain the body in the position reached.

Two rings, disposed concentrically in relation to each other and to the body, are connected with each other via a spring element having great axial rigidity and, at the same time, great tangential flexibility. One of the two rings is fixedly connected with the stator.

On the outside of the two rings facing away from the body at least one lever is provided on each ring. Both levers are connected with each other at their ends via a flexible connecting piece. The connecting piece can be bent radially in respect to the body, for example by means of a piezo element or of an electromagnet.

In an embodiment in accordance with the invention, at least two connections, actively movable with the rings, are fixedly connected on the inside of the two rings facing the body or the shaft. The free ends of the connections are adapted to the surface of the shaft and are polished for a better transfer of force. At least one piezo element is disposed on the movable connections. If the piezo element of the movable connection which is not connected with the stator is triggered, the movable connections come to lie against the shaft. The piezo element or the electromagnet on the flexible connecting piece is triggered overlapping the triggering of the piezo element on the movable connections. Because of the bending of the connecting piece caused by this, the ring not connected with the stator and thus the shaft connected with the ring via the movable connections moves by a small rotational step in one direction against the effect of the spring element and of the second ring supported on the stator. The direction of rotation depends on the piezo element or the triggering of the piezo element. The size of the angle of rotation per step on the voltage applied to the piezo element or to the electromagnet.

After performing the step, the piezo elements of the movable connections of the ring connected with the stator are triggered and the movable connections are connected with the shaft. In this way they maintain the shaft in the attained position. After turning off the voltage of the first triggered piezo elements, the movable connections are released from the shaft and the ring not connected with the stator is returned to the initial position by the spring element. The next step is initiated by triggering the piezo elements of the movable connections of the ring not connected with the stator as well as the piezo element or the electromagnet on the flexible connecting piece and by turning off the voltage of the piezo elements located on the movable connections of the ring connected with the stator.

In a further embodiment in accordance with the invention, the two axial ends of the rings which are oriented in opposite directions from each other each have at least one electromagnet. A ferromagnetic part is fastened on the body or the shaft on a resilient part located opposite the electromagnet. The ends of the rings which have a groove consist at least partially of a ferromagnetic material. An annular winding is disposed in each of the ends of the rings having the groove, which forms an electromagnet together with the ferromagnetic material. The ferromagnetic part fastened by means of a resilient part on the body or the shaft forms the movable part of the electromagnet. In this embodiment in accordance with the invention one ring is also fixedly connected with the stator. The flexible connecting piece is disposed in exactly the same manner as already described in connection with the first embodiment in accordance with the invention. Either an electromagnet, which causes bending of the connecting piece, can act on the connecting piece, or it is also possible here to dispose a piezo element.

Instead of the piezo elements recited in the first exemplary embodiment, the corresponding electromagnets are triggered for executing the rotational steps.

In a further exemplary embodiment the ends of the rings which are oriented in opposite directions from each other can have yokes to which windings have been applied in order to form an electromagnet. Here, too, the ends which are oriented in opposite directions from each other consist at least partially of a ferromagnetic material.

In a further exemplary embodiment the ends of the rings consisting at least partially of a ferromagnetic material are embodied U-shaped. At least one winding to form an electromagnet is disposed on at least one leg of the U-shaped rings.

A ferromagnetic part, fastened via a resilient part or a diaphragm-like disk on the body or the shaft, can form the axially movable part of the electromagnet in the last two exemplary embodiments.

The spring elements connecting the two rings with each other have great rigidity in the axial direction, while they are very flexible in the tangential direction. The great rigidity and the great flexibility of the spring elements are a result of their dimensions in these directions. Great flexibility is demanded because the spring elements have to generate as steady as possible a spring force in the tangential direction, against which the rings must be displaced to execute a rotational step and which restores the ring not connected with the stator into the original initial position after execution of a rotational step.

The piezo elements disposed on the connecting piece or the electromagnet acting on the connecting piece can be triggered with a variable voltage for a variable step size.

In a further exemplary embodiment of the step motor, overlapping diaphragm-like parts of a ferromagnetic material are disposed on the body and the rings, which are axially moved by means of magnets located on the rings and in this way represent solid connections suitable for a transfer of force in the area where they overlap.

By means of this disposition it is also possible to rotate a body, for example a hollow body, located outside of the rings, in relation to a stationary shaft. For this purpose the movable connections are disposed outside of the rings and the flexible connecting piece inside of the rings. One ring is fixedly connected with the stationary shaft.

Triggering and the course of the movement take place as already described.

DESCRIPTION OF THE DRAWINGS

The invention will be described in detail in the following description by means of the drawings.

Shown are in:

FIG. 1 shows the basic construction of the step motor in axial sectional view. The shaft, which is freely rotatable on the stator via bearings 6, 7, has been designated by 1. The stator is fixedly connected with the ring 3. Rings 2, 3 connect the spring elements 4, 5. At least two connections 8, 9 of the stator, actively movable in respect to the shaft 1 or the rotor of the shaft 1, are disposed on the side of the rings 2, 3 facing the shaft 1.

The rotor is understood to be the ring 2 together with the movable connections 9 which rotate the shaft 1.

Figure 6:
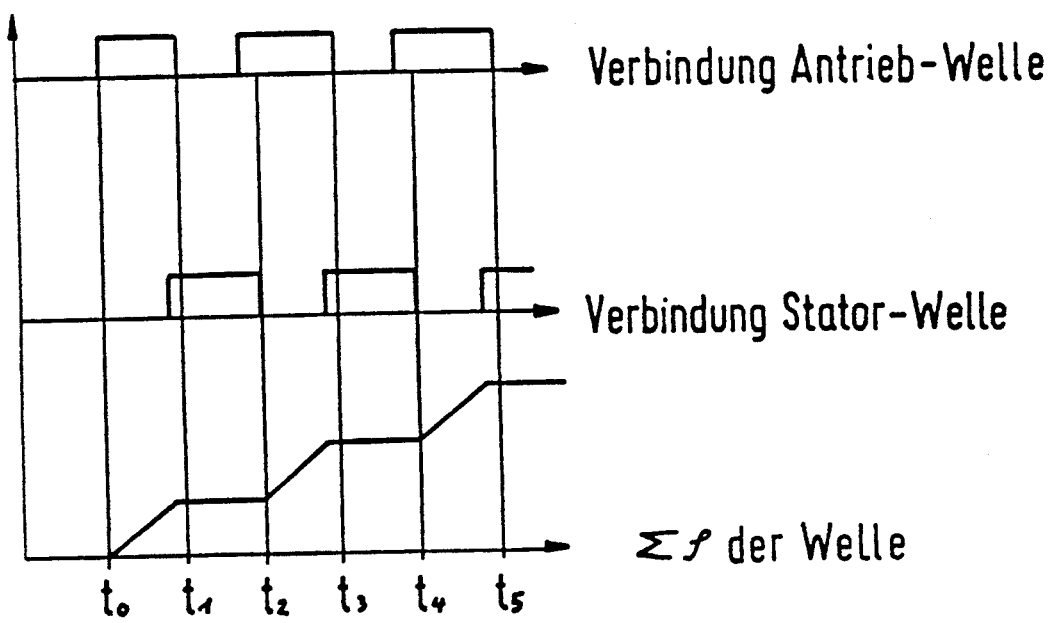
FIG. 6 a diagram.

To perform a rotational step, the movable connections 9 on the ring 2 are supplied with voltage at the time $t_0$ (FIG. 6). The movable connections 9 come to rest against the shaft 1. The flexible connecting piece 12 (not shown) is triggered slightly later in time and rotates the shaft 1 against the spring force of the spring elements 4, 5 in one direction. The movable connections 8 of the stator with the shaft 1 are triggered after the performance of the rotational step slightly ahead of the time $t_1$. The movable connections 8 come to rest against the shaft 1. After the movable connections 8 are in contact with the shaft 1, the movable connections 9 of the rotor with the shaft 1 are turned off at the time $t_1$. The movable connections 8 of the stator with the shaft 1 maintain the shaft 1 in the attained position until the next step. The next step commences with the movable connections 9 of the rotor with the shaft 1 being triggered slightly ahead of the time $t_2$.

Figure 1:
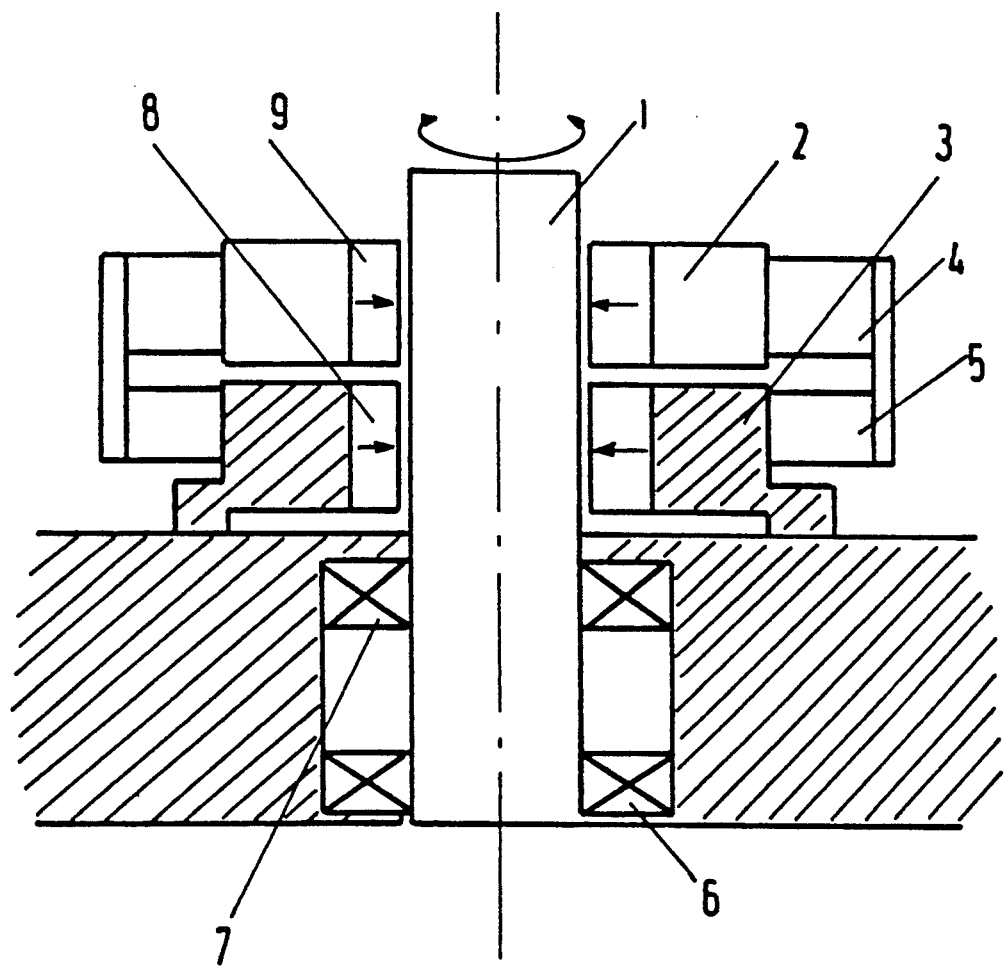
FIG. 1 the basic construction of the step motor in axial section.
Figure 2:
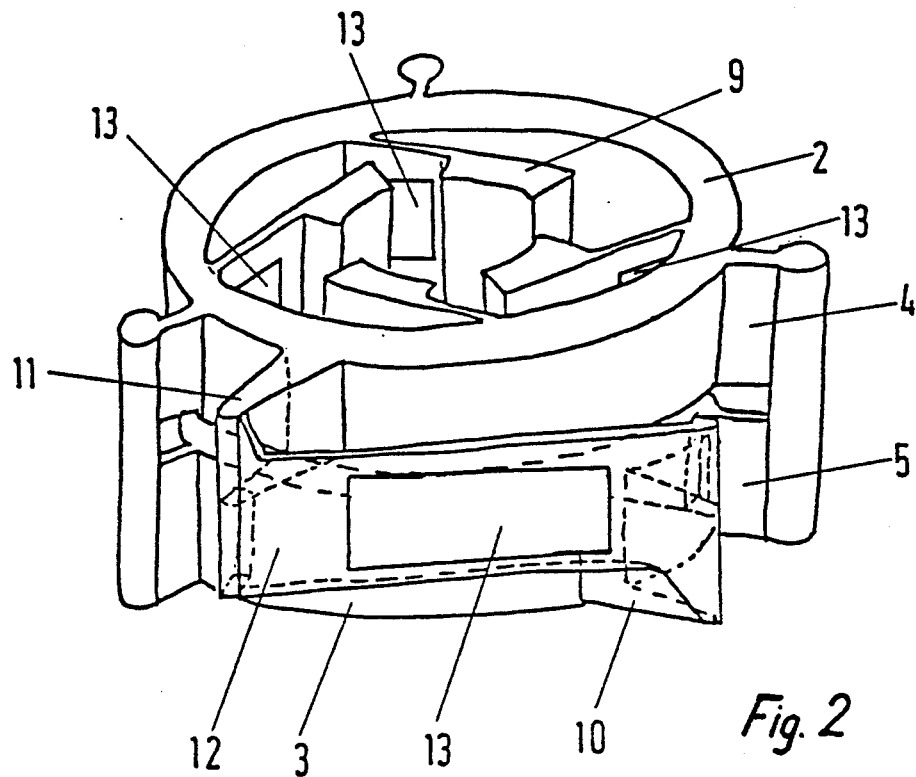
FIG. 2 an exemplary embodiment of the step motor in a perspective view, without the shaft, FIG. 3 a further exemplary embodiment of the step motor in a perspective view, without the shaft, FIG. 4 a further exemplary embodiment of the step motor in axial section, FIG. 5 a basic view of the rings with spring elements.

FIG. 2 shows an exemplary embodiment of the step motor in a perspective view, without the shaft. The rings 2, 3 are connected with each other via the spring elements 4, 5. Levers 10, 11 are fastened on the rings 2, 3, which are connected with each other at their ends via the flexible connecting piece 12. The movable connections 8, 9 are disposed inside the rings 2, 3. The free ends of the movable connections 8, 9 are adapted to the surface of the shaft (not shown). Piezo elements 13 are disposed on the front and back of the movable connections 8, 9 and on the flexible connecting piece 12.

Of course, an electromagnet or other drive can act on the flexible connecting piece 12.

Figure 3:
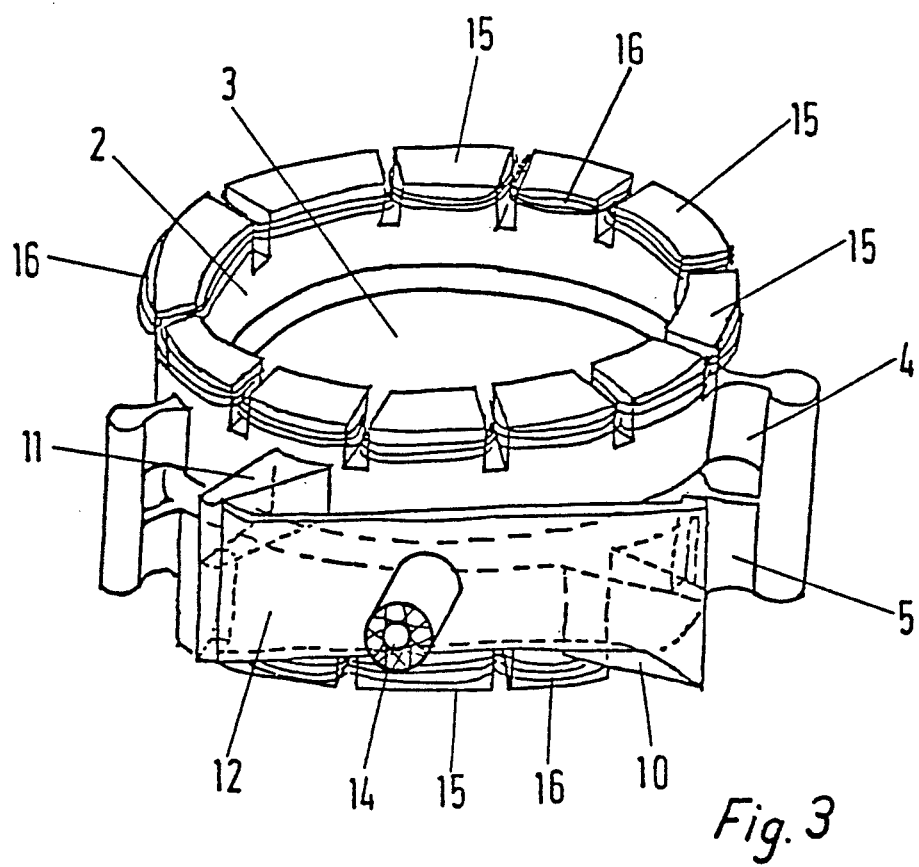
Figure 4:
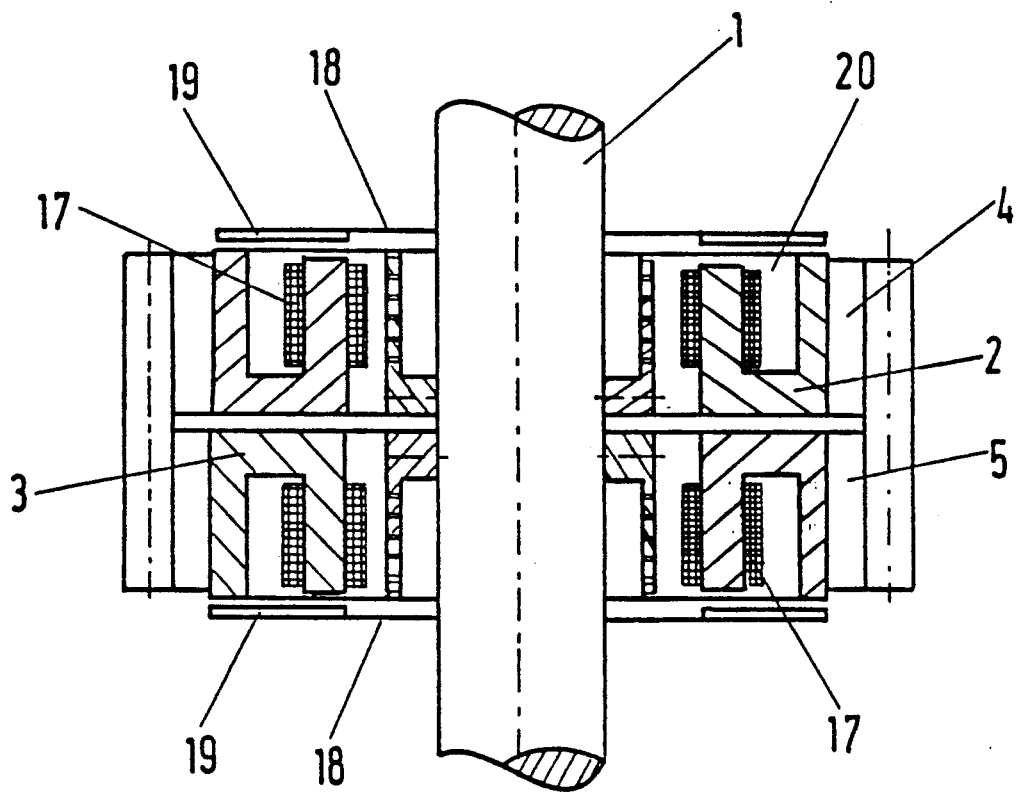

FIG. 3 shows a further exemplary embodiment of the step motor in a perspective view, without the shaft. The axial ends of the rings 2, 3 oriented in opposite directions from each other are embodied yoke-shaped. Windings 16 are disposed on the yokes 15. The rings 2, 3 are at least partially made of a ferromagnetic material to form electromagnets. An electromagnet 14 acts on the flexible connecting piece 12. As shown in FIG. 4, the connection of the rotor with the shaft or of the stator with the shaft is made via at least one each of a resilient part 18, located axially opposite the two rings 2, 3 and fastened on the shaft, and the ferromagnetic part 19, or via a diaphragm-like disk located axially opposite the two rings 2, 3 and a ferromagnetic part.

FIG. 4 shows a further exemplary embodiment of the step motor in an axial sectional view. The axial ends of the rings 2, 3 facing in opposite directions from each other and consisting at least partially of a ferromagnetic material are embodied U-shaped. A winding 17 is disposed on each of the arms of the U-shaped rings 2, 3 facing the shaft 1. In a further embodiment of the step motor, the windings are disposed in the form of toroidal windings in the groove 20. Located opposite the U-shaped rings 2, 3, in the exemplary embodiment illustrated in FIG. 4, ferromagnetic parts 19 are fixed on the shaft 1, via at least one resilient part 18 or via a diaphragm-shaped disk, which are used as the movable parts or as return path elements of the electromagnets. In this exemplary embodiment, too, a ring, for example ring 3, is fixedly connected with the stator.

In this exemplary embodiment the flexible connecting piece 12 is disposed in the same way as shown in FIG.

3. Again at least one piezo element 13 is disposed on the flexible connecting piece 12, or an electromagnet generates the bending of the connecting piece 12.

To perform a rotational step, the electromagnet of the ring 2 not connected with the stator is triggered at the time $t_0$, FIG. 6. A connection between the ring 2 and the shaft 1 is made by attracting the movable part 18, 19 of the electromagnet. The electromagnet 14 acting on the flexible connecting piece 12 or the piezo element 13 (not shown) located on the flexible connecting piece 12 is triggered slightly later than the triggering of the electromagnet disposed on the ring 2. Because of the bending of the connecting piece 12 caused by this, the shaft 1 rotates in one direction against the spring force of the spring elements 4, 5. After the rotational step has been performed, the electromagnet of the ring 3, connected with the stator, is triggered slightly ahead of the time $t_1$. A connection between the ring 3 and the shaft 1 is made by attracting the movable part 18, 19 of this electromagnet, and the shaft 1 is maintained in the attained position. After turning off the voltage of the electromagnet triggered first at the time $t_1$, the corresponding movable part 18, 19 of the electromagnet 17 swings back into the initial position and the ring 2 not connected with the stator is moved back into the initial position by means of the spring force of the spring elements 4, 5.

The next step is initiated in that, slightly ahead of the time $t_2$, the electromagnet of the ring 2 not connected with the stator and, a little later in time in respect to this, the electromagnet 14 acting on the flexible piece 12 or the piezo element 13 located on the flexible connecting piece 12 are triggered and the electromagnet of the ring 3 connected with the stator is turned off at the time $t_2$.

Figure 5:
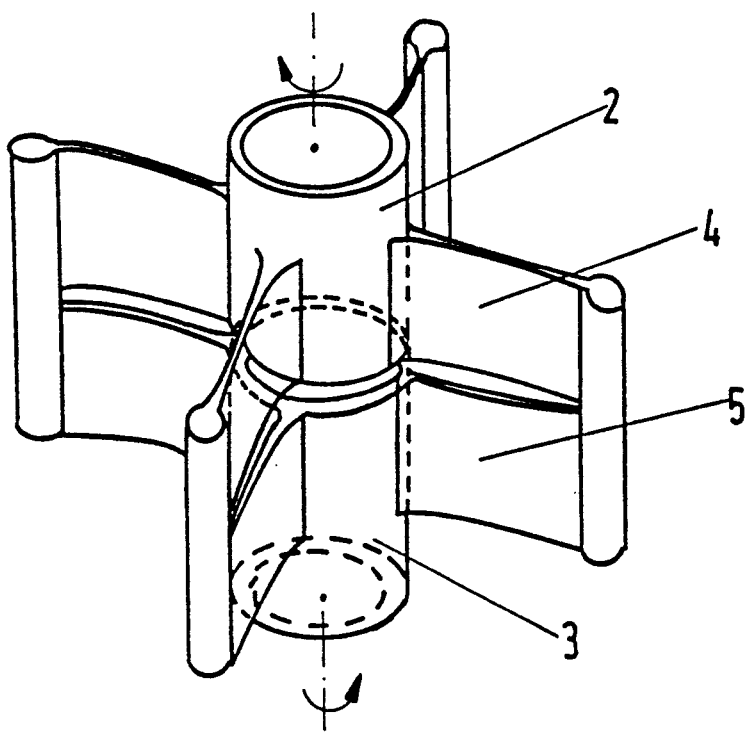

FIG. 5 shows a basic view of the rings 2, 3 with the spring elements 4, 5.

Figure 7:
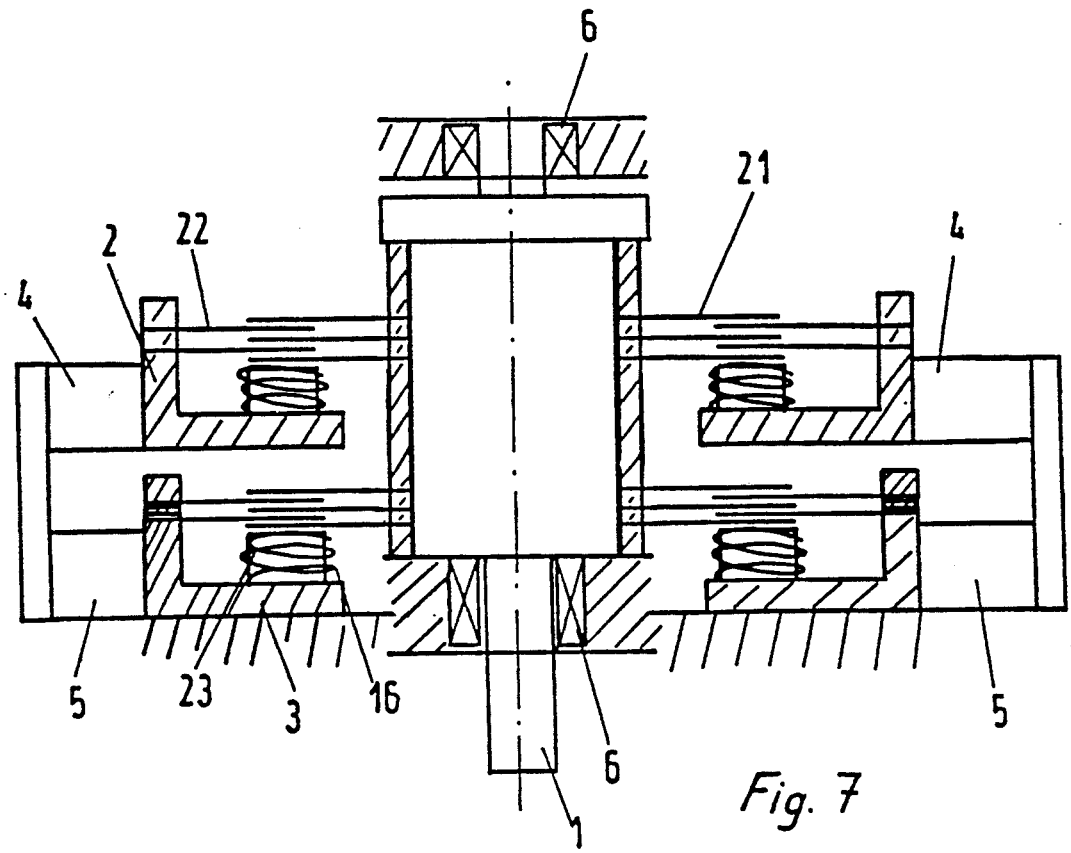
FIG. 7 a further exemplary embodiment of the step motor in axial section.

A a further exemplary embodiment of the step motor in accordance with the invention is shown in axial section in FIG. 7. In this exemplary embodiment axially offset L-shaped rings 2, 3 are connected with the spring elements 4, 5. The ring 3 is fixedly mounted on the housing. Yokes 23 with windings 16 are disposed on the rings 2, 3. The rings 2, 3 support ferromagnetic, axially resilient rings 22 which, together with the ferromagnetic diaphragm-like disks 21 fastened on the shaft 1, the windings 16 and the yokes 23, form an electromagnet. For this purpose the rings 22 and the disks 21 are placed so they overlap in the area of the yoke 23. They are pressed together by a magnetic field and as a stack form a sufficiently thick magnetic return path.

Because the diaphragm package consisting, of the disks 21 and the rings 22, is formed alternatingly of disks 21 connected with the body or the shaft 1 and of rings 22 connected with the yoke rings 2, 3, as a whole they assure strong static friction sufficient for a transfer of force.

In a state where the disks 21 and rings 22 are free of the magnetic field, they easily detach themselves from each other and free the shaft 1. Slight touching of each other hardly results in friction. Of course, the yoke rings 2, 3 can also be disposed in such a way that the yokes 12 with the windings 16 and the diaphragm package are located opposite each other.

Figure 8:
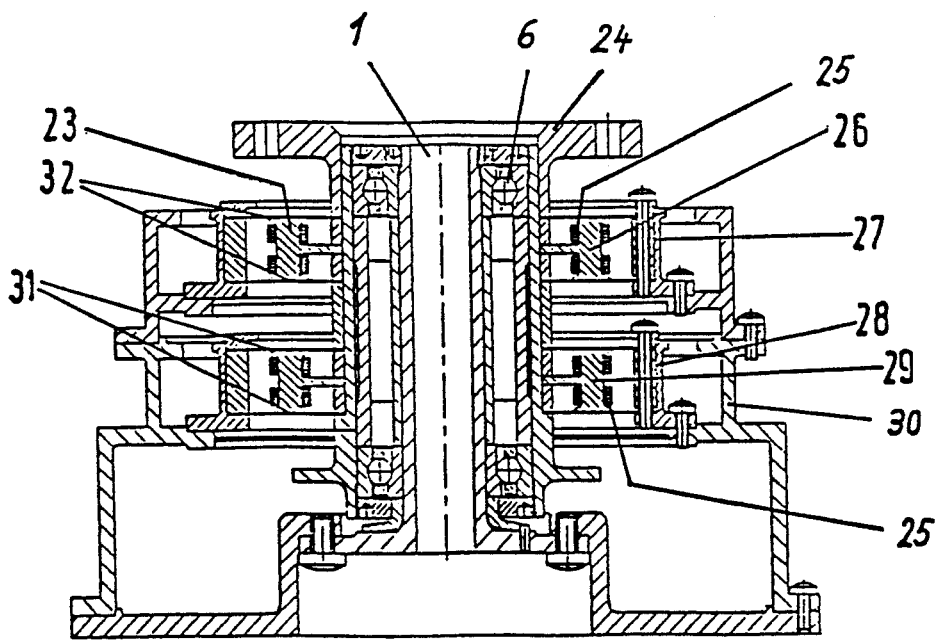
FIG. 8 an improvement of the exemplary embodiment shown in FIG. 7 in axial section.

FIG. 8 shows an improvement of the exemplary embodiment illustrated in FIG. 7. This arrangement consists of two drives 25, 26, 27, 32; 25, 28, 29, 31, which are disposed axially offset coaxially to the shaft 1. The individual drives are essentially composed of yoke rings 26, 29 embodied in the shape of the letter T, of torsion rings 27, 28, replacing the spring elements 4, 5 employed in the previously described examples, and of the diaphragm packages 31, 32. The long legs of the yoke rings 26, 29 embodied in the shape of the letter T are fastened on the shaft 1. Each one of the short legs of the T is embodied as a yoke 23 and supports the windings 25. Together with the diaphragm packages 31, 32, the yokes 23 and the windings 25 form electromagnets which in the attracted state provide a solid connection between the shaft 1 and the drive 25, 26, 27, 32; 25, 28, 29, 31 in one case, or in the other between the housing 30 and the drive 25, 26, 27, 32; 25, 28, 29, 31.

In this figure the reference numeral 6 indicates the bearing and the reference numeral 24 the flange for the output. Continuous rotation of the shaft 1 is achieved by this double drive 25, 26, 27, 32 and 25, 28, 29, 31 with appropriate triggering, for example in accordance with FIG. 10.

Figure 9:
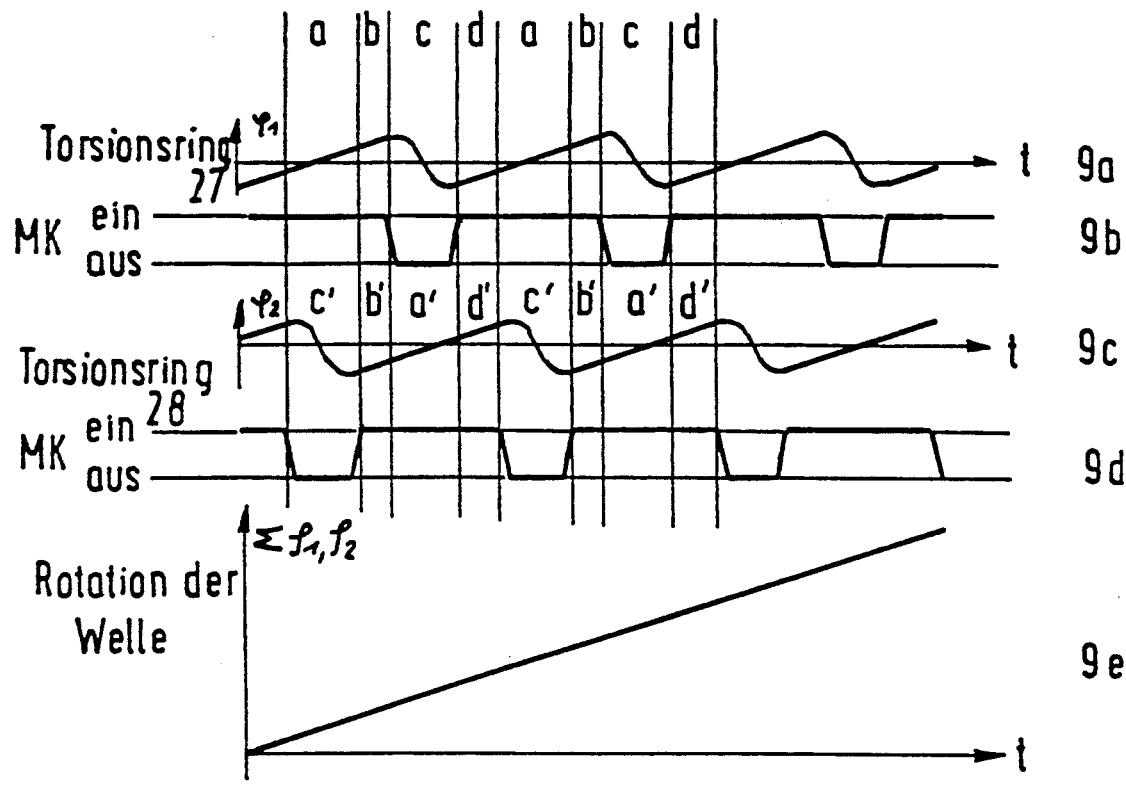
FIG. 9 a diagram.

The diagram of FIG. 9 illustrates the mode of operation of the arrangement in accordance with FIG. 8.

The cooperation of the torsion ring 27 with the magnetic coupling MK, consisting of the winding 25, the yoke ring 26 and the diaphragm package 32 is shown in FIGS. 9a and 9b. FIGS. 9c and 9d show the cooperation of the torsion ring 28 with the magnetic coupling MK, consisting of the winding 25, the yoke ring 29 and the diaphragm package 31.

The torsion ring 27 is triggered in such a way that it performs a movement in accordance with FIG. 9a. The torsion ring 27 moves through a small angle in one direction with the slowly rising flank (periods of time d, a, b). In the course of the steeply falling flank (period of time c), the torsion ring 27 is moved back into its initial position. It can be seen in FIG. 9b that the torsion ring 27 is connected with the shaft 1 (magnetic coupling MK engaged) during the slowly rising flank (FIG. 9a) (periods of time d, a, b) and in this way rotates the shaft 1 through a small angle.

In the period of time c, the connection between the torsion ring 27 and the shaft 1 is broken (magnetic coupling MK disengaged).

FIGS. 9c and 9d show the same process with the torsion ring 28 and the magnetic coupling 25, 29, 31. During the periods of time b', a', d', the torsion ring 28 moves through a small angle in the same direction in which the torsion ring 27 had moved during the periods of time d, a, b (FIG. 9a). The torsion ring 28 is also moved back into its initial position during the steeple falling flank (period of time c'). The magnetic coupling MK, consisting of the winding 25, the yoke ring 29 and the diaphragm package 31, has made the connection between the torsion ring 28 and the shaft 1 during the periods of time b', a', d'. Accordingly, the shaft 1 has again been rotated through a small angle.

By combining the two rotations in accordance with FIGS. 9a and 9b, a continuous movement of the shaft 1 in accordance with FIG. 9e results because of the overlapping drive of the shaft 1 by the two torsion rings 27, 28 during the periods of time b, b' and d, d'.

During the period of time a the torsion ring 27 takes over transporting of the shaft 1, while the torsion ring 28 is returned into the initial position by the spring force present (period of time c'). During the periods of time b and b' both torsion rings 27, 28 are connected with the shaft 1 and both contribute to the rotation of the shaft 1. During the period of time c, the torsion ring 27 moves back into its initial position and the torsion ring 28 takes over transporting of the shaft 1 (period of time a'). During the periods d, d', both torsion rings 27 and 28 again contribute to the rotation of the shaft 1. These courses of movement are repeated. The direction of rotation of the shaft 1 can be reversed by an appropriate change of the triggering of the torsion rings 27, 28.

Figure 10:
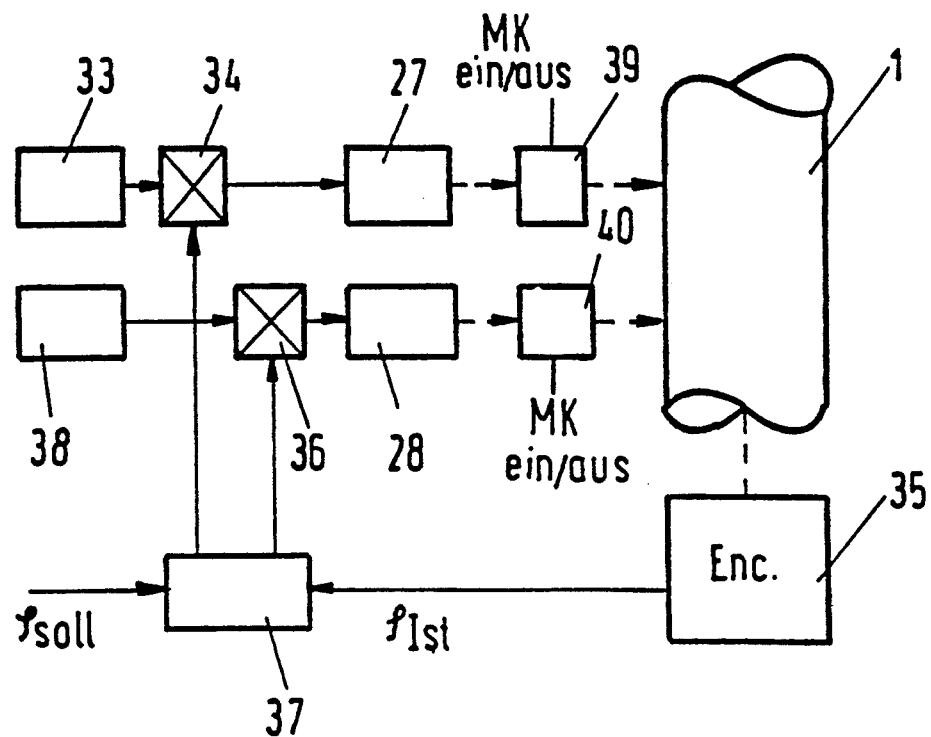
FIG. 10 an exemplary embodiment of a trigger circuit of an arrangement in accordance with FIG. 8, FIG. 11 an improvement in accordance with FIG. 1 in a top view.

FIG. 10 shows an exemplary embodiment of the triggering of an arrangement in accordance with FIG. 8.

The momentary position of the shaft 35 is sensed by an encoder 35. The encoder 35 transmits a signal $\phi_{Ist}$, corresponding to the momentary position of the shaft 1, to a comparator 37. A signal $\phi_{Soll}$, corresponding to the set position of the shaft 1, is supplied to the comparator 37 via a second input. The difference signal is supplied to two multipliers 34, 36, which multiply the difference signal with the output signals of two frequency generators and only supply an output signal in the form of an operating signal to the torsion rings 27, 28, if the comparator 37 supplies a difference signal. The movements of the torsion rings 27, 28 are only passed on to the shaft 1, if the magnetic couplings MK 39, 40 are engaged, i.e. during the periods of time d, a, b, or b', a', d' of FIG. 9.

Figure 11:
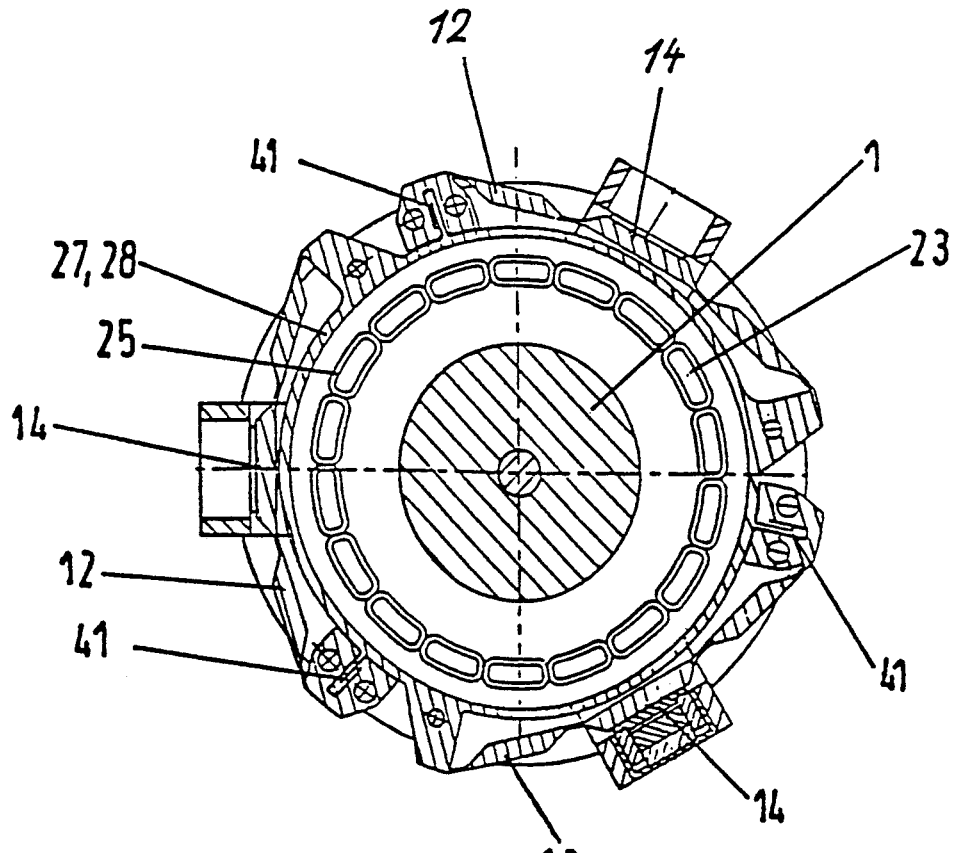

FIG. 11 illustrates the improvement in accordance with FIG. 8 in a top view.

The spring elements 4, 5 employed in the embodiments in accordance with FIGS. 1, 2, 3, 4, 5 and 7 have been replaced by torsion elements 41. The flexible connecting piece 12 acts on the torsion element 41. The magnetic drive 14 is disposed on the flexible connecting piece 12. The end of the flexible connecting piece 12 located opposite the torsion element 41 is fixedly connected with the housing, so that when the magnetic drive is operated, the connecting piece can be directly supported on the housing. The maximum step size of the step motor is determined by the torsion element 41.

LIST OF REFERENCE NUMERALS

| | |
|---|---|
| 1 | Shaft |
| 2, 3 | Ring |
| 4, 5 | Spring element |
| 6, 7 | Bearings |
| 8 | Connection stator-shaft |
| 9 | Connection rotor-shaft |
| 10, 11 | Lever |
| 12 | Flexible connecting piece |
| 13 | Piezo element |
| 14 | Electromagnet |
| 15 | Yoke |
| 16 | Winding |
| 17 | Winding |
| 18 | Resilient part |
| 19 | Ferromagnetic part |
| 20 | Groove |
| 21 | Ferromagnetic disk |
| 22 | Ferromagnetic ring |
| 23 | Yoke |
| 24 | Output |
| 25 | Winding |
| 26 | Yoke ring |
| 27 | Torsion ring |
| 28 | Torsion ring |
| 29 | Yoke ring |
| 30 | Housing |
| 31 | Diaphragm package |
| 32 | Diaphragm package |
| 33 | Frequency generator 1 |
| 34 | Multiplier 1 |
| 35 | Encoder |
| 36 | Multiplier 2 |
| 37 | Comparator |
| 38 | Frequency generator 2 |
| 39 | Magnetic coupling 1 |
| 40 | Magnetic coupling 2 |
| 41 | Torsion element |
| MK | Magnetic coupling |

We claim:

1. In a stepping motor for rotating body through small angles of rotation, including
   a stator and a rotor,
   actively moveable connection means for selectively connecting each of the stator and rotor to the body,
   a drive which can be triggered and acts on the rotor, wherein, for performing an individual rotational step, the triggering of the drive and the connecting of the rotor with the body are essentially effected during a given period of time, and each time after performing an rotational step, triggering of the connection of the stator with the body takes place in order to maintain the body in the particular position attained,
   the improvement comprising:
   at least one spring element which acts counter to the rotation of the rotor and stator in relation to each other and is provided between the rotor and the stator, and two rings disposed coaxially to each other and to the body, one of said rings being fixedly connected with said stator and the other of said rings forming part of said rotor, and said spring element being connected between said rings.

2. A stepping motor in accordance with claim 1 wherein said drive comprises two arms each connected to a respective ring and each having a free end; and a flexible, actively bendable connecting piece connected between said free ends of said two arms.

3. A stepping motor in accordance with claim 2 wherein said drive further comprises a piezo element mounted on said connecting piece.

4. A stepping motor in accordance with claim 2 wherein said drive further comprises an electromagnet mounted to act on said connecting piece.

5. A stepping motor in accordance with claim 1 wherein each said ring has a side disposed to face the body, and wherein said connection means comprise at least two actively movable connections mounted on said side of each said ring and controllable by said drive for engagement with the body.

6. A stepping motor in accordance with claim 5 further comprising a piezo element mounted on at least one said connection.

7. A stepping motor in accordance with claim 5 further comprising an electromagnet mounted to act on at least one said connection.

8. A stepping motor in accordance with claim 1 wherein each said ring has two axial ends, with one axial end of one said ring facing away from one axial end or the other said ring, and said connection means comprise:
   two electromagnets each mounted on the one axial end of a respective ring;
   two resilient parts each connected to the body at the location of one axial end of a respective ring; and
   two ferromagnetic parts each connected to a respective resilient part and located opposite a respective electromagnet.

9. A stepping motor in accordance with claim 8 wherein said one axial end of each said ring is composed at least in part of a ferromagnetic material and is provided with a groove, and each said electromagnet has at least one annular winding disposed in said groove at said one axial end of a respective ring.

10. A stepping motor in accordance with claim 8 wherein said one axial end of each said ring is provided with a yoke, and each said electromagnet has windings on said yoke at said one axial end of a respective ring.

11. A stepping motor in accordance with claim 8 wherein said one axial end of each said ring is composed at least in part of a ferromagnetic material and has the shape of U with two legs, and each said electromagnet has at lest one winding placed on at least one leg of said U at said one axial end of a respective ring.

12. A stepping motor in accordance with claim 8 wherein each said resilient part comprises a thin disc which extends perpendicularly to the axis of rotation of the body.

13. A stepping motor in accordance with claim 1 wherein said spring element has a longitudinal axis parallel to the axis of rotation of the body, a high degree of rigidity to bending of the longitudinal axis and a high degree of torsional flexibility about the longitudinal axis.

14. A stepping motor in accordance with claim 4 wherein said piezo element is deformable by a variable voltage.

15. A stepping motor in accordance with claim 5 wherein said electromagnet is operable by a variable voltage.

16. A stepping motor in accordance with claim 8 wherein each said resilient part comprises at least one thin disc extending perpendicularly to the axis of rotation of the body, and further comprising at least one thin ring element carried by each said ring and extending perpendicularly to the axis of rotation of the body.

17. A stepping motor in accordance with claim 16 wherein said one axial end of each said ring is provided with a yoke, each said electromagnet has windings on said yoke at said one axial end of a respective ring, said thin disc of each said resilient part and said thin ring element carried by each said ring overlap one another in an area adjacent a respective yoke.

18. A stepping motor in accordance with claim 17 wherein each said thin disc and each said thin ring element is made of a ferromagnetic material.

19. A stepping motor in accordance with claim 1 wherein said connection means comprises:
two electromagnet carried by the body;
two resilient parts each carried by a respective ring; and
two ferromagnetic parts each connected to a respective resilient part and located opposite a respective electromagnet.

* * * * *